Jan. 12, 1960 S. L. BROADHEAD, JR., ET AL 2,921,273

AUTOMATIC ANTENNA COUPLER

Filed Nov. 19, 1956 3 Sheets-Sheet 1

INVENTORS
SAMUEL L. BROADHEAD, JR.
MERRILL T. LUDVIGSON
BY Marvin Moody
ATTORNEY INVENTORS
SAMUEL L. BROADHEAD, JR.
MERRILL T. LUDVIGSON
By Marvin Moody
ATTORNEY INVENTORS
SAMUEL L. BROADHEAD, JR.
MERRILL T. LUDVIGSON
BY Marvin Moody
ATTORNEY United States Patent Office 2,921,273
Patented Jan. 12, 1960

2,921,273

AUTOMATIC ANTENNA COUPLER

Samuel L. Broadhead, Jr., and Merrill T. Ludvigson, Cedar Rapids, Iowa, assignors to Collins Radio Company, Cedar Rapids, Iowa, a corporation of Iowa Application November 19, 1956, Serial No. 623,088

6 Claims. (Cl. 333—17)

This invention pertains to networks for matching impedances of a load to a line and particularly to networks that are automatically tuned for matching an output line or load to an input line that has applied thereto signal over a wide frequency range. Specifically, the present invention is an improvement in automatic control circuits for positioning capacitive and inductive elements in an impedance matching network in proper sequence for obtaining maximum efficiency in transfer of energy from a line to a load.

An object of the present invention is to provide an improved control system for obtaining maximum transfer efficiency in an impedance matching network.

Another object is to provide a variable inductor having a variable tap for use in an impedance matching network.

The description of the control system of this invention and the appended claims may be more readily understood with reference to the following drawings, in which:

Figures 1, 2, 3:
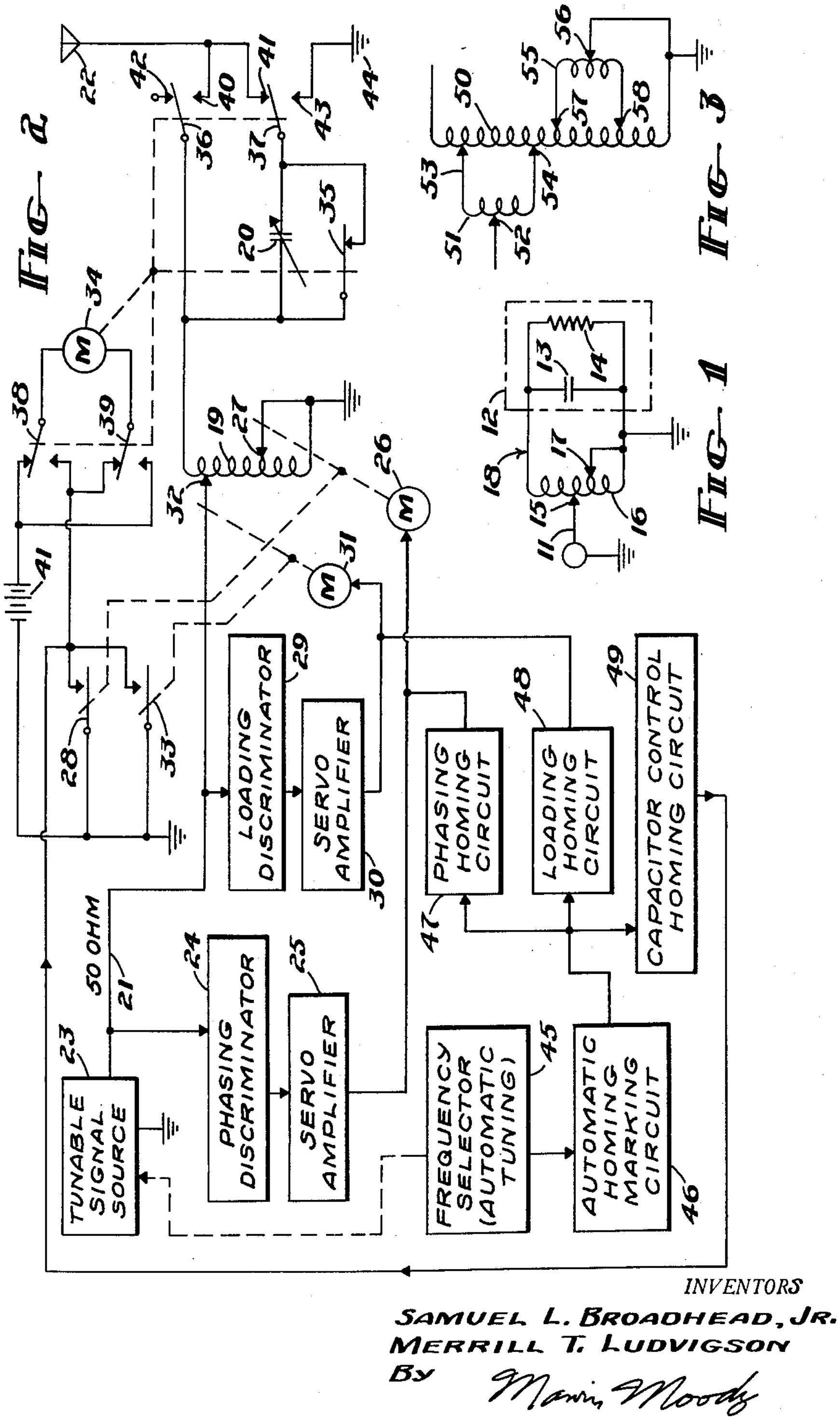
Figure 1 shows a simplified schematic of a usual impedance matching network.
Figure 2 shows the impedance matching system of this invention in a combination block and schematic diagram.
Figure 3 shows a simplified schematic of the variable inductor shown in Figure 4.

The usual impedance matching network shown in Figure 1 is connected to an input line 11 and an output line or load circuit 12 which is represented by an equivalent capacitor 13 and load resistor 14, the capacitor and resistor being connected in parallel. The input line 11 is connected to variable tap 15 of variable inductor 16 so that the input line 11 is connected between ground and that point of inductor 16 which is determined by the position of the variable tap 15. The variable inductor and the output load circuit 12 are connected in parallel. In this example, tap 17 is used to short-circuit different numbers of turns for varying inductance. Other usual means may be used to vary inductance of inductor 16. For example, a powdered iron core that is movable relative to the winding may be used.

It is well known in the art that impedance of the output line 12 may be matched to the impedance of input line 11 providing the capacitive reactance of equivalent capacitor 13 is equal to the selected value of inductive reactance of inductor 16 and the equivalent resistor 14 has a resistance greater than the resistance required by the input line 11 for proper loading. When these conditions are fulfilled, impedance of output line 12 can be matched to the impedance of input line 11 for various values of equivalent resistor 14 by properly positioning tap 15 on inductor 16. When the capacitive reactance of the load is greater than the maximum inductive reactance of variable inductor 16, a capacitor may be connected in parallel with inductor 16 and load 12. When the resistance of the load is low, a capacitor may be connected in series with inductor 16 and load 12 to provide desired loading on input line 11. The automatic control circuits of this invention control the inductance of the variable inductor, control the position of the tap through which the "input line" is connected to the inductor, and add required capacitance to the output circuit in proper sequence for most efficient operation.

Typical requirements of automatic control apparatus to be used with an impedance matching network are illustrated in the following example. An input line having an impedance of 50 ohms is to be matched to a radio antenna. The input line is connected to a radio transmitter that applies signal thereto at any selected frequency between 2 megacycles and 30 megacycles. Over this frequency range the resistance and capacitive reactance of the antenna varies widely. For example, the resistance of the antenna at one frequency may be less than 10 ohms while the resistance of the antenna for the next selected frequency may be well in excess of 1000 ohms. Likewise, the capacitive reactance varies over a wide range from a low value to a value greater than the maximum inductive reactance provided by the variable inductor of the impedance matching network. To obtain maximum efficiency when a capacitor is connected in parallel with the load, the lowest possible value of capacitance should be used in the impedance matching network to match the antenna to the input line, and when a capacitor is connected in series, the highest possible value of capacitance should be used. When a desirable antenna is used, no capacitance in addition to the natural capacitance of the antenna should be required within much of the frequency range over which the apparatus is to be operated.

Additional capacitance will be required in the matching network when either the resistance or the natural capacitance of the antenna is so high that the capacitive current is smaller than the lowest inductive current provided by the variable inductor matching network. Also, additional capacitance is required when the resistance of the antenna is so low that the antenna cannot be matched with the input line through the use of the inductor alone.

In order to obtain maximum efficiency the present invention adds capacitance to the matching network as required, and whenever possible adds capacitance in series with the load rather than in parallel. For example, when the impedance of load 12 is inductive, capacitance is inserted in series with inductor 16 and load 12 at point 18, and the capacitance is varied from maximum to minimum. If the resistance or the reactance of the load is such that the capacitive reactance remains higher than the inductive reactance during variation of the series capacitance, then the capacitance is connected in parallel with load 12 and inductor 16 and varied from minimum to maximum until the capacitive reactance is equal to the inductive reactance. When the resistance of a load 12 is so low that matching cannot be accomplished through use of tapped variable conductor 16 alone, the control circuits in the present invention automatically connect the capacitance in series, and vary it from maximum toward minimum until the load reflected from the output circuit matches the impedance of the input line.

A new combination of circuits for controlling inductive and capacitive elements in a matching network is shown in Figure 2. The matching network includes variable inductor 19 and variable capacitor 20. The matching network is connected between 50-ohm line 21 and an antenna or a load circuit 22. The input line 21 is connected to a tunable signal source or radio transmitter 23. Circuits for controlling phase between voltage and current on input line 21 include phasing discriminator 24 and servo amplifier 25 which are connected in cascade to servo motor 26. The output of servo motor 26 is coupled to tap 27 of variable inductor 19 and to limit switch 28 that is in the control circuit of an actuator for varying the capacitance of the matching network. One terminal of the inductor and tap 27 are connected to ground so that the portion of the inductor between ground and the variable tap 27 that is positioned by motor 26, is short-circuited and is not effective in adding inductance to the matching network. After the motor has been actuated for placing substantially maximum inductance in the network, continued operation of the motor in the same direction operates limit switch 28.

Circuits for controlling the load on input line 21 include loading discriminator 29, servo amplifier 30 and servo motor 31 connected in cascade between input line 21 and tap 32 of inductor 19. Operation of servo motor 31 varies the position of tap 32 on inductor 19 for determining what portion of variable inductor 19 is connected across the input line. Continued operation of motor 31, after tap 32 has been positioned for substantially maximum inductance, operates limit switch 33. Limit switches 28 and 33 are connected in parallel in the control circuit that operates to determine the capacitance added to the network by capacitor 20.

The phasing discriminators and servo amplifiers are conventional. For example, the input to the phasing discriminator may be taken from a length of metallic tubing (not shown) that encircles input line 21. A central point of this tubing is connected through a capacitor to a common return circuit or ground, and the ends of the tubing are connected to rectifiers in a conventional discriminator circuit. The discriminator is arranged so that output voltage is zero when the voltage and current on input line 21 are in phase. When the voltage on the input line is out of phase with the current, the discriminator develops an output voltage that is either positive or negative according to whether the current is leading or lagging the voltage. The direction of rotation of servo motor 26 is, therefore, dependent upon the phase condition in line 21.

The input to the loading discriminator consists of a voltage input and a current input. In the present example that is operative over a frequency range from 2 megacycles to 30 megacycles, the current input may consist of a 22-turn toroid coil (not shown) encircling line 21. In order to obtain the desired phase relationship a low value resistor is shunted across the 22-turn winding. The voltage input may consist of a variable coupling capacitor connected to the line. A resistor having high resistance is shunted across this capacitor for obtaining small phase correction. A conventional resistor and rectifier network are connected between the 22-turn coil and the coupling capacitor for completing a discriminator circuit. The values are chosen so that the output of the discriminator 29 is zero for a desired current-to-voltage ratio on line 21. When the ratio differs from the pre-determined ratio, a voltage, the polarity of which is dependent upon whether the load is high or low, is applied to the input of servo amplifier 30. Servo motor 31, which is connected to the output of amplifier 30, operates to move tap 32 in the proper direction for returning the voltage-to-current ratio of line 21 to its pre-determined value.

Variable capacitor 20 is coupled to motor or actuator 34. The motor is also coupled through conventional toggle operating means to double-throw switches 36, 37, 38, and 39. These switches are operated by the actuator whenever the capacitor is operated to its maximum or to its minimum position. Actuator 34 is also effective in operating single-pole switch 35 which is connected across capacitor 20. This switch is closed to short-circuit capacitor 20 only when the capacitor is in position for maximum capacitance. When capacitor 20 is in position for maximum capacity, capacitor-connecting switches 35, 36, and 37 are positioned as shown in Figure 2. While the switches are in this position, the output load 22 is connected directly across variable inductor 19. The output load in this example is an antenna circuit that includes antenna 22 and ground 44. When actuator 34 is operated to change capacitance of capacitor 20 from maximum to minimum, switch 35 is opened for connecting capacitor 20 in series with inductor 19 through contacts 41 of switch 37. Switch 36 is open-circuited at contact 42. When the capacitor is positioned for minimum capacitance, switches 36 and 37 are operated by actuator 34. The switches then complete circuits through contacts 40 and 43 for placing capacitor 20 in parallel with inductor 19 and antenna circuit 22. Also, reversing switches 38 and 39 are operated by actuator 34 to reverse the direction of rotation of motor 34. As the motor operates in the reverse direction, the capacitance of capacitor 20 is varied from minimum to maximum.

The operating circuit for actuator 34 consists of a source of D.C. voltage 41 that is connected through parallel limit switches 28 and 33 to motor reversing switches 38 and 39.

Contact 28 is closed for operating actuator 34 when tap 27 of inductor 19 is in position for inserting maximum inductance in the impedance matching network. Limit switch 33 is operated when tap 32 of inductor 19 is in position for placing maximum inductance and, therefore, maximum reflected load across input line 21.

Homing circuits are provided for returning the inductive and capacitive elements of the matching network to a normal starting or home position. The operation of these circuits may be initiated by a pulse that is transmitted from automatic transmitting tuning apparatus 45 when this apparatus is operated for changing the transmitting frequency of signal source 23. This impulse is received at automatic homing marking circuit 46 which may, for example, include a self-locking relay for marking circuits of seeking switches that are contained within individual homing circuits. Circuits that control the homing of switches and other controlling elements are old in telephony and in automatic radio tuning circuits. The output of the automatic homing marking circuit is connected to phasing homing circuit 47, loading homing circuit 48, and to capacitor-control homing circuit 49. The phasing homing circuit causes servo motor 26 to operate until tap 27 of inductor 19 is positioned for placing maximum inductance across the output circuit. Output of loading homing circuit 48 is connected to servo motor 31 for causing it to operate until tap 32 of inductor 19 is in position for placing maximum inductance across input line 21. Capacitor-control homing circuit 49 is connected to the control circuit of actuator 34 for operating the actuator until variable capacitor 20 is set for maximum capacitance and switches 35, 36, and 37 are returned to their home positions as shown in Figure 2. After the homing circuits have completed their operation in response to selection of a different frequency, phasing discriminator 24 and loading discriminator 29 are effective in operating their respective servo systems. Servo motors 26 and 31 and actuator 34 continue to operate until the impedance of antenna 22 for the newly selected frequency is matched to the 50-ohm line 21.

Figure 4:
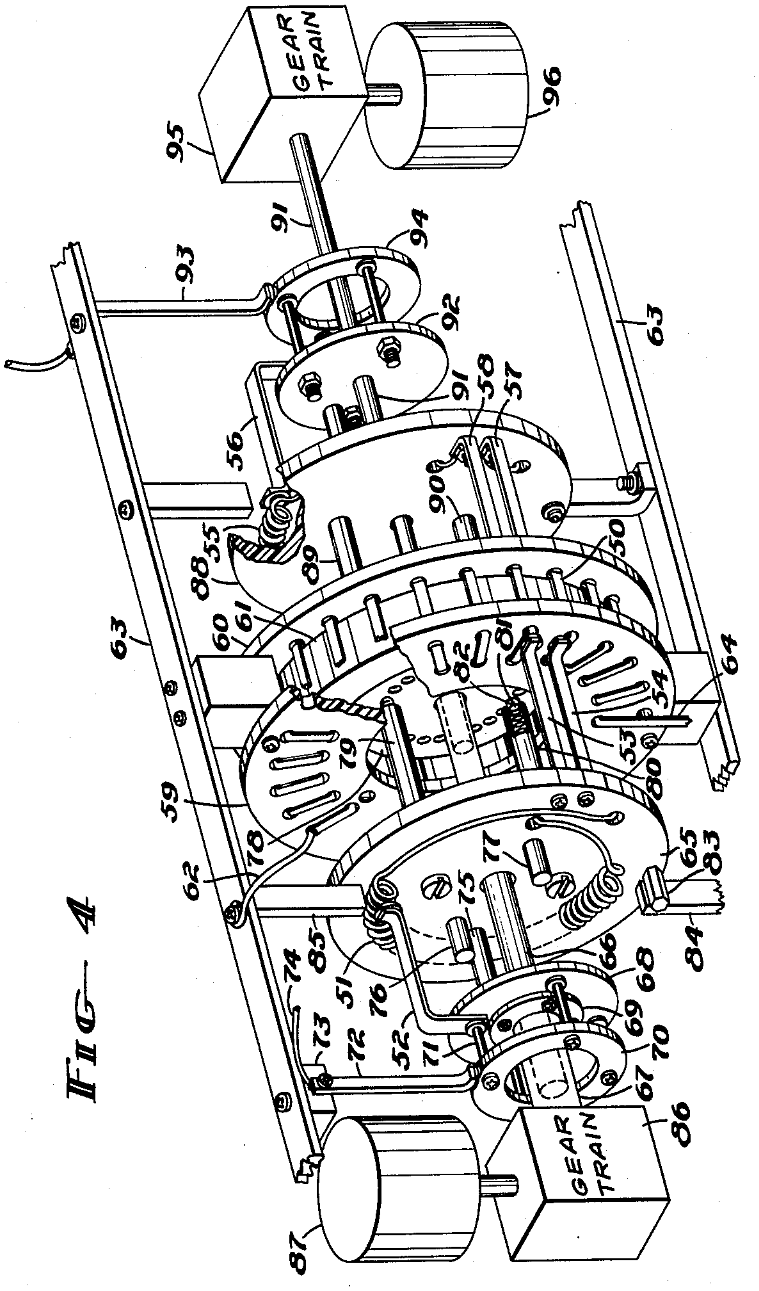
Figure 4 shows a simplified oblique view of a variable toroid inductor having exploded and cutaway portions for showing the operational details thereof.
Figure 5:
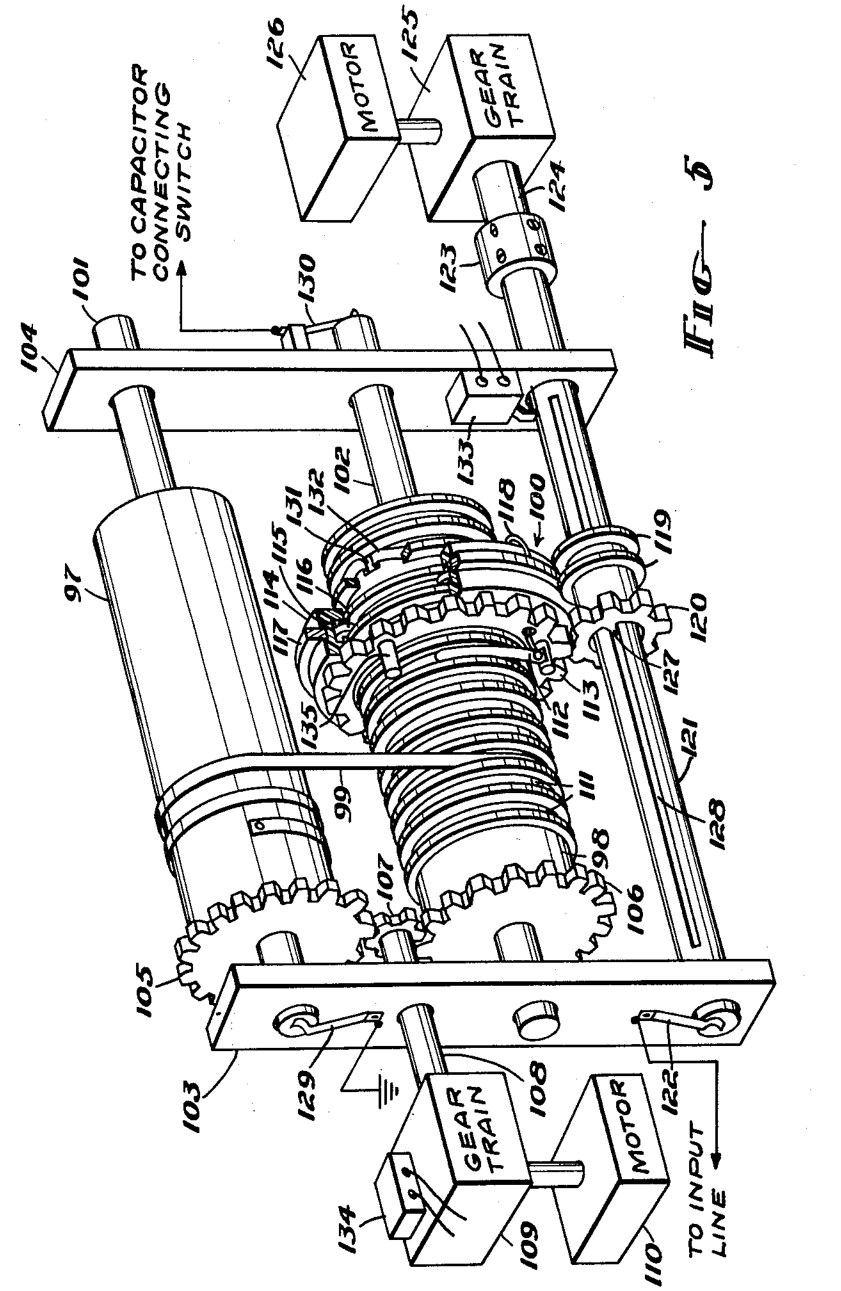
Figure 5 shows an oblique view of a solenoid inductor with a rotary tap.

The automatic control impedance matching network of Figure 2 requires a continuously variable inductor having a continuously variable tap. Either a toroid inductor as shown in Figure 4 or a solenoid inductor as shown in Figure 5 operates satisfactorily. The solenoid of Figure 5 is particularly useful in high power systems because undesirable arcing is reduced to a minimum in a relatively compact inductor assembly.

With reference to a simplified schematic of Figure 3 and the exploded diagram of Figure 4, the toroid inductor consists of a main toroid winding 50 and two fine-trimming windings 51 and 55. Fine trimming-winding 51 is connected across a small portion of the main winding 50 through coarse-inductor wipers 53 and 54. External connection to fine-trimming winding 51 is made through fine-trimming wiper 52. Fine-trimming wiper 52 operating in conjunction with coarse-inductor wipers 53 and 54 provide a variable contact corresponding to tap 32 shown in Figure 2. Likewise, fine-trimming winding 55 is connected across a small portion of inductor 50 through coarse-inductor wipers 57 and 58. Fine-trimming wiper 56, which contacts fine-trimming winding 55, operates in conjunction with coarse-inductor wipers 57 and 58 to provide a variable contact corresponding to tap 27 shown in Figure 2. The coarse-inductor wipers connected to each of the fine-trimming windings are operable for changing inductance in the network in discrete steps. Values of inductance between those obtainable from successive positions of the coarse-inductor wipers are provided by operation of the fine-trimming wipers.

Specifically, in Figure 4 the winding form for main toroid winding 50 consists of two disks 59 and 60 of insulating material separated by a powdered iron or ferrite annular core. The disk and the core are coaxially mounted and rigidly fixed together. Each of the disks has two rings of definitely-spaced holes. The inner ring of holes has a radius equal to or slightly smaller than the inner radius of the iron core, and the outer ring of holes has a radius equal to or slightly larger than the outer radius of the core. The ribbon is threaded through the holes to provide a continuous winding with definitely-spaced turns about core 61. The end terminal 62 of winding 50 is connected directly to the frame 63 and corresponds to that end of inductor 19 of Figure 2 that is connected to ground. The opposite terminal 64 corresponds to that end of inductor 19 that is connected to variable capacitor 20 of Figure 2.

Fine-trimming winding 51 is a helical coil of many small turns. The coil is formed into a portion of a ring and attached to disk 65. The disk is rotatably mounted on shaft 66 which is coaxial with the toroid windings. Wiper 52 that travels over toroid winding 51 is attached through an insulating washer assembly to hollow shaft 67 which is concentric with shaft 66. The wiper mounting assembly consists of insulating washer 68, metallic washer 69, and contact ring 70 which are coaxially mounted. Wiper 52 is affixed to insulating washer 68 and metallic washer 69 is affixed to shaft 67. Contact ring 70 is electrically connected to wiper 52 through fastener 71. Spring wiper 72 that contacts ring 70 is mounted to the frame through insulating block 73 and is connected to conductor 74 which corresponds to incoming line 21 of Figure 2.

A stop arrangement is disposed between washer 68 and disk 65 for limiting the rotation of wiper 52 of fine-trimming toroid winding 51 and after the stops have been engaged for rotating the fine-trimming winding and the coarse-inductor wipers 53 and 54. The stop arrangement consists of pin 75 which projects from the face of washer 68 toward fine-trimming winding disk 65 and pins 76 and 77 which project from the face of disk 65. The pins are all mounted on equal radii so that they engage as wiper 52 is rotated to the limit of its range with respect to winding 51. As shown in Figure 4, wiper 52 has been operated fully clockwise over winding 51 and stop pins 75 and 76 are engaged. Further rotation of shaft 67 in a clockwise position for rotating wiper 52 will result in the rotational motion being transferred through pins 75 and 76 to disk 65 for rotating coarse-inductor wipers 53 and 54 over turns of winding 50. When drive shaft 67 is operated in a counter-clockwise direction, wiper 52 is rotated until pin 75 engages pin 77. Further counter-clockwise operation causes wipers 53 and 54 to be rotated in the opposite direction over the turns of winding 50. While wiper 52 is being rotated over fine-trimming winding 51, coarse-inductor wipers 53 and 54 are held stationary by a detent mechanism that is disposed between disk 65 and the main toroid winding. The detent mechanism consists of detent plate 78 that is rigidly mounted to the main toroid winding and detent posts 79 and 80 that are mounted to disk 65. Detent plate 78 has indentations arranged in a circle that is coaxial with the main winding. Each indentation is located for positioning coarse-inductor wipers 53 and 54 on corresponding turns of main winding 50. The end of each of detent posts 79 and 80 that is adjacent to detent plate 78 has a cylindrical bore for receiving spring 81 and ball 82. The detent operates in the usual manner for exactly positioning coarse-inductor wipers 53 and 54.

The stop device for the coarse-inductor wipers include pin 83, which projects from the side of disk 65, and stop posts 84 and 85, which are attached to frame 63. Shaft 67 for driving the wipers is connected through gear train 86 to motor 87 that corresponds to motor 31 in the impedance matching system of Figure 2.

The fine-trimming winding 55 is located on that side of main toroid winding 50 that is opposite fine-trimming winding 51 and has control apparatus arranged similarly to that described for fine-trimming winding 51. This winding is mounted on disk 88 which carries coarse-inductor wipers 58 and 58 that contact turns of main toroid winding 50. Disk 88 carries detent posts 89 and 90 for positioning wipers 57 and 58 accurately on the turns of winding 50. Wiper 56 is affixed to drive shaft 91 through insulating washer 92 and is connected to wiper 93 through conducting ring 94. The stop devices for limiting rotation of the wipers 56, 57, and 58 are arranged similarly to those for wipers 52, 53, and 54. Wiper 93 is connected to frame 63 and corresponds to tap 27 of inductor 19 as shown in Figure 2. It will be noted that the portions of inductor windings connected between fine-trimming winding 55 and end terminal 62 of winding 50 are short-circuited through frame 63. Drive shaft 91 is coupled through gear train 95 to motor 96. Motor 96 of Figure 4 corresponds to servo motor 26 of Figure 2.

Limit switches corresponding to switches 28 and 23 of Figure 2 may be connected in a conventional manner to gear trains 95 and 86, respectively. These switches (not shown in Figure 4) may be mounted adjacent to the circumference of disks 65 and 88 and a small cam may be attached to each of the disks 65 and 88 for operating the respective limit switch. Of course, it is understood that in the exploded view of Figure 4 the lengths of the wipers and of the fasteners that hold together the insulating wiper assemblies has been exaggerated.

The inductor of Figure 5 includes a conducting cylindrical coil form 97 and a non-conducting cylindrical coil form 98. These forms are mounted with their axes parallel and have means for rotating them in the same direction. Conducting ribbon 99, which comprises the winding of the inductor, is wound around the two forms so that when the forms are rotated, the conductor is unwound from one form and wound on the other. The portion of the conductor that is wound on conducting form 97 is short-circuited and becomes ineffective in providing inductance. Inductance of the inductor is, therefore, dependent upon that portion of conducting ribbon 99 that is wound on non-conducting form 98. To this inductor has been added a new tap assembly 100 for providing a continuously variable tap on a variable inductor that is suitable for application to the system shown in Figure 2.

The forms 97 and 98 are mounted on parallel shafts 101 and 102. These shafts are rotatably mounted between parallel end supports 103 and 104 which are fabricated from electrical insulating material. Spur gears 105 and 106 are rigidly fastened to shafts 101 and 102, respectively, for rotating respective coil forms 97 and 98. Both of these gears engage gear 107 that is affixed to drive shaft 108. Drive shaft 108 is rotatably mounted between shafts 101 and 102 on end support 103, and is driven through gear train 109 by motor 110. Motor 110, when used in the system of Figure 2, corresponds to motor 26.

On the outer surface of non-conducting form 98 is a helical groove 111 for receiving conducting ribbon 99. A variable tap for the inductor is provided by wiper 112 which is attached to tap assembly 100. The tap assembly is arranged for moving wiper 112 along groove 111 for contacting the bare outer surface of conducting ribbon 99. Tap assembly includes ring gear 113 of non-conducting material attached to insulating collar 114. The inside diameters of gear 113 and collar 114 are slightly larger than the outside diameter of coil form 98. The inside surface of collar 114 has a groove 115 in which are mounted a plurality of spaced rollers 116. These rollers are placed in groove 111 for threading tap assembly 100 onto coil form 98. Conducting ring 117 is mounted on the periphery of insulating collar 114 and is connected to contact 112 through conductor 118 which extends through holes provided in collar 114 and gear 113. A pair of conducting rings 119 are coaxially attached to gear 120 to form an assembly that is mounted on shaft 121. Shaft 121 is rotatably mounted parallel to the coil forms between end supports 103 and 104 and spaced relative to tap assembly 100 for engaging ring gear 113 with gear 120 and contact ring 117 between the pair of conducting rings 119. Shaft 121 has a longitudinal groove 128 for receiving an internal tooth 127 that projects inwardly from gear 120. Gear 120 is, therefore, free to move longitudinally on shaft 121 but is not free to rotate thereon. Electrical connection from wiper 112 is completed through shaft 121 to spring contact 122 which is urged against the end of the shaft. Shaft 121 is connected through insulating coupling 123 to drive shaft 124 which is connected to the output of gear train 125. The input of gear train 125 is connected to motor 126 which corresponds to motor 31 of Figure 2 when this inductor is used in the automatic matching system.

Electrical connection across the variable inductor is made through contact 129 that bears against shaft 101 and contact 130 which bears against shaft 102. As previously described, one end of inductor 99 is connected through conducting coil form 97 to shaft 101. The other end of inductor 99 is threaded inwardly through hole 131 and connected to shaft 102. In order that the diameter of groove 111 may have uniform diameter for retaining tap assembly 100, a plastic ribbon 132 may be placed in the groove near the end of the form beyond that point where conducting ribbon 99 enters hole 131. Limit switch 133, which corresponds to switch 33 of Figure 2, is mounted on end support 104 so that it is operated by mechanical contact with tap assembly 100 when it is rotated until the tap is positioned at the end of conductor 99. Limit switch 134 is mechanically connected to gear train 109 so that it is operated when coil forms 97 and 98 have been rotated until most of conducting ribbon 99 is wound on the non-conducting coil form 98.

When the inductor of Figure 5 is used in the automatic impedance matching system of Figure 2, motors 110 and 126 operate in response to the selection of a new frequency for rotating inductive elements to a starting or home position. Coil forms 97 and 98 are rotated until substantially all of conducting ribbon 99 is wound on nonconducting coil form 98 so that maximum inductance is provided between contacts 129 and 130. Tap assembly 100 is rotated so that substantially all of the conducting ribbon that is wound on coil form 98 is connected between contact 122 and contact 129. These elements can still be rotated slightly in the direction for maximum inductance beyond their home position for operating limit switches 134 and 133. After the inductive elements have been homed, motor 110 operates through gear train 109 for rotating coil forms 97 and 98. When decreased inductance is required for obtaining proper phase relationship on the input line, the coil forms are rotated in that direction for reducing the number of turns on non-conducting form coil 98 until proper phase relationship is obtained. However, if the reactance of the output circuit is such that greater inductance is required, the motor operates in the opposite direction to operate limit switch 134. Operation of this limit switch changes the capacitance in the impedance matching network as described hereinafter.

When the voltage-to-current ratio on the input line is too high, motor 126 operates through gear train 125, gear 120, and ring gear 113 for rotating tap assembly 100. As tap assembly 100 is rotated to follow helical groove 98, ring 117 rotates between the pair of rings 119 that are attached to gear 120. The rings move gear 120 longitudinally along shaft 121 for retaining gear 120 in engagement with ring gear 113. Tap assembly 100 is rotated until contact 112 is so positioned on ribbon 99 that desired load is obtained on the input line. Unless there are circuit difficulties, tap assembly 100 is stopped before it contacts that portion of contacting ribbon 99 that extends between coil forms 97 and 98. Ribbon guard 135 extends from the side of ring gear 113 and contacts ribbon 99 in the event rotation is continued. This guard, which has smooth edges, stops the rotation of tap assembly 100 without damaging conducting ribbon 99. When the voltage-to-current ratio is low even though tap assembly 100 is set for obtaining maximum inductance between contacts 122 and 129, motor 126 rotates in the opposite direction for rotating tap assembly 100 to that position for operating limit switch 133. Operation of limit switch 133 completes the capacitor control circuit for changing the capacitance in the impedance matching network.

The system of Figure 2 operates in a particular sequence to match impedance of antenna 22 to the impedance of input line 21 so that energy is transferred most efficiently from source of signal 23 to antenna 22. In response to the operation of frequency selector 45, signal source 23 is tuned for applying signal of the newly selected frequency to line 21. Also, in response to the operation of frequency selector 45, automatic homing marking circuit 46 operates for completing phasing homing circuit 47, loading homing circuit 48, and capacitor-control homing circuit 49. Completion of these homing circuits cause respective motors 26, 31, and 34 to operate until the matching network that comprises inductor 19 and capacitor 20 is set in a homing position. In response to the operation of the homing circuits, tap 27 of inductor 19 is positioned for placing maximum inductance across antenna circuit 22; tap 32 is positioned for placing maximum inductance across antenna input line 21; and capacitor 20 is operated to a position for maximum capacitance but is short-circuited by switch 35. In the homed position, the capacitor-connecting switches 36 and 37 are positioned for connecting capacitor 20 in series with antenna 22; but while switch 35 is closed to short-circuit capacitor 20, the antenna circuit is connected directly across inductor 19 which is adjusted for maximum inductance.

After the homing operation has been completed, servo systems operate to provide most efficient matching of the load to the input line. Phasing discriminator 24 is responsive to a difference in phase between voltage and current on line 21 for developing voltage that has a polarity dependent upon whether the current is leading or lagging the voltage. This voltage is applied through servo amplifier 25 to motor 26 for causing it to rotate in a direction corresponding to the polarity of the applied voltage. If the current on line 21 leads the voltage, motor 26 operates to decrease the inductance of inductor 19. When no output voltage is developed by phasing discriminator 24 to indicate that the voltage and current on line 21 are in phase, motor 26 ceases operation.

In the event that the current lags the voltage after the homing operation has been completed, the opposite polarity is developed by phasing discriminator 24 and motor 26 operates in the opposite direction for operating tap to its limit position for operating limit switch 28. In response to the operation of limit switch 28, actuator 34 operates to decrease the capacitance of capacitor 20. As actuator 34 starts to decrease the capacitance of capacitor 20, switch 35 is opened so that capacitor 20 is connected in series with inductor 19 and antenna 22. Providing the resistance of the output circuit is not high relative to the impedance of a matching network, the required capacitance will be obtained while capacitor 20 is connected in series. When the voltage and current in the input line are in phase, actuator 34 ceases to operate and motor 31 operates to provide proper loading on the input line 21. However, when capacitor 20 is connected in series, the capacitive reactance of the network may be greater than the inductive reactance at any setting of capacitor 20. In this event, actuator 34 continues to operate until capacitor 20 is positioned for minimum capacitance. Switches 36 and 37 are then operated by the actuator for connecting capacitor 20 in parallel with inductor 19 and antenna 22. Also, switches 38 and 39 are operated for reversing the direction of rotation of actuator 34. The actuator then operates to increase the capacitance of capacitor 20 until the capacitive reactance of the system is equal to the inductive reactance.

After the phasing servo system has operated for matching capacitive and inductive impedances, the loading servo system operates for providing proper voltage-to-current ratio on the input line. Loading discriminator 29 is responsive to a variation from a predetermined voltage-to-current ratio for developing a voltage to be applied to servo amplifier 30. The polarity of the voltage applied to the servo amplifier is dependent upon whether the voltage-to-current ratio is high or low relative to the desired ratio. This voltage is applied through servo amplifier 30 to motor 31 to cause it to rotate in a direction corresponding to the polarity of the applied voltage. When the voltage-to-current ratio on line 21 is high, motor 31 operates to decrease the inductance of inductor 19 that is applied across input line 21. When tap 32 has been positioned by motor 31 for obtaining the desired voltage-to-current ratio, the discriminator output voltage becomes zero and motor 31 ceases to operate. If variation of tap 32 has produced a slight change in phase on input line 21, motor 26 will again operate to provide the slight necessary adjustment. The impedance matching network is now adjusted for maximum transfer of power from input line 21 to antenna 32.

In the event that the resistance of antenna 22 is low relative to the impedance of input line 21, motor 31 will rotate in the opposite direction for operating limit switch 33. In response to the operation of limit switch 33, actuator 34 will operate to connect capacitor 20 in series with inductor 19 and antenna 22, as previously described, and capacitor 20 will be operated from maximum capacitance toward minimum capacitance until the desired voltage-to-current ratio has been obtained on input line 21.

Although this invention has been described with respect to particular embodiments thereof, it is not to be so limited as changes and modifications may be made therein which are within the full intended scope of the invention as defined by the appended claims.

What is claimed is:

1. In an electrical impedance matching network and its control system, an input line, an output line that is to be matched to said input line, a variable coupling means coupling said input line to said output line, a first control means for varying said coupling means over a predetermined range, said first control means having a maximum position for maximum coupling, a variable inductive means within said network for adding inductance to said coupled lines, a second control means for varying said inductive means over a predetermined range, said second control means having a maximum position for maximum inductance, an actuator, actuator control means connected to said first and second control means and operable in response to either of said first or second control means being operated to a respective maximum position, a variable capacitor and a capacitor-connecting switch drivingly coupled to said actuator, said capacitor-connecting switch being connected to said variable inductive means, said capacitor, and to said output line, said switch being operable to different positions for connecting said output line directly in parallel with said inductive means, for connecting said output line in series with said capacitor and said inductive means, and for connecting said line in parallel with both said capacitor and said inductive means, said output line normally being connected through said capacitor-connecting switch directly to said inductive means, said actuator operating to position said capacitor-connecting switch and said variable capacitor for sequentially connecting said capacitor in series with said output line and said inductive means, varying the capacitance of said capacitor for maximum to minimum, connecting said capacitor in parallel with said output line and said inductive means, and varying the capacitance of said capacitor from minimum to maximum.

2. In an impedance matching system controlled automatically for operation over a wide range of frequencies, an input line, an output load circuit, a variable inductor and a variable capacitor in an impedance matching network, a capacitor-connecting switch, a variable tap on said variable inductor, said capacitor-connecting switch normally connecting said output load circuit directly in parallel with said variable inductor, said input line being connected through said variable tap to a portion of said inductor, phasing means for automatically varying the inductance of said inductor within a predetermined range to change relative phase of voltage and current on said input line, said phasing means having a normal position near a position of maximum inductance obtainable within its range, loading means for automatically varying the position of said tap within a predetermined range on said inductor to change the ratio of voltage-to-current on said input line, said tap having a normal position near a position of maximum voltage-to-current ratio obtainable within its range, an actuator for operating said capacitor-connecting switch and said variable capacitor, a control circuit with first and second control switches connected to said actuator, said control switches being individually operable for operating said actuator, said phasing means operating said first switch in response to the inductance requirements being greater than that provided when said phasing means is in its normal position, said loading means operating said second switch when the voltage-to-current ratio needs to be greater than that provided when said tap of said inductor is in its normal position; said actuator operating in response to the operation of either of said control switches for operating said capacitor-connecting switch and said capacitor in a particular sequence to connect said capacitor in series with said variable inductor and said output load circuit, to vary the capacitance of said capacitor from maximum to minimum, to connect said capacitor in parallel with said inductor and said output load circuit, and to vary said capacitor from minimum to maximum; said loading means, said phasing means, and said actuator ceasing to operate in response to a predetermined phase and load condition on said line, means for changing frequencies of signal applied to said input line, and means responsive to operation of said last means for returning said capacitor to a position for maximum capacitance, for returning said capacitor-connecting switch to a normal position, and for returning said phasing means and said tap to normal positions prior to the operation of said inductor and said capacitor by said loading means and said phasing means.

3. In an impedance matching system having an impedance matching network that includes a variable inductor and a variable capacitor; an automatic control system arranged to control said inductor and said capacitor in the required sequence for obtaining maximum transfer efficiency, said automatic control system including first and second electro-mechanical servo systems, first and second limit switches operated respectively by said first and second servo systems, an actuator for said capacitor, said actuator operating in response to the operation of either of said limit switches; an input line, an output circuit that is to be matched to said input line, switching means connected to said actuator, said output circuit normally being connected through said switching means directly across said variable inductor, a variable tap on said variable inductor, said input line being connected to said variable tap for connecting a portion of said inductor thereacross, said first electro-mechanical servo system having a phase-sensing input circuit connected to said input line and a mechanical connection for varying the inductance of said inductor, said first servo system operating in response to a difference in phase of voltage and current on said input line to change the inductance of said inductor as required for obtaining in-phase voltage and current on said input line, said first servo system operating said first limit switch when the inductance of said inductor is maximum, said actuator operating in response to the operation of either of said limit switches to operate said switching means for sequentially connecting said variable capacitor in series with the circuit that includes said variable inductor and said output circuit, to vary the capacitance of said capacitor from maximum to minimum, to operate said switching means for connecting said capacitor in parallel with said variable inductor and said output circuit, and to vary the capacitance of said capacitor from minimum to maximum; said second electro-mechanical servo system having a load-sensing input circuit connected to said input line and a mechanical connection for varying the position of said tap on said inductor, said second servo system operating in response to a variation from a predetermined ratio of current-to-voltage on said line, said second servo system operating said second limit switch to cause operation of said actuator when said tap is positioned for maximum inductance across said input line, and said actuator, said first and second servo systems ceasing to operate in response to proper matching of said output circuit to said input line for obtaining in-phase voltage and current and predetermined loading on said input line.

4. In an automatically-controlled electrical impedance matching system, a variable inductor and a variable capacitor, said inductor having three toroid windings comprising a main winding and first and second trimming windings, said main winding having turns rigidly fixed at predetermined points about the circumference thereof, said trimming windings having closely-spaced turns, each of said turns of said trimming windings having small inductance relative to each turn of said main winding, said trimming windings being coaxially and rotatably mounted on opposite sides of said main winding, first and second pairs of coarse-inductor wipers connected to said first and second trimming windings respectively, each of said coarse-inductor wipers extending from a different end terminal of its respective winding to contact a different turn of said main winding, said coarse-inductor wipers thereby connecting each of said trimming windings across a small selected portion of said main winding, first and second detents disposed between said main winding and said first and second trimming windings respectively, each of said detents effective in positioning the corresponding trimming winding and pair of coarse-inductor wipers exactly so that the coarse-inductor wipers contact selected turns of said main winding, first and second trimming wipers for contacting said first and second trimming windings respectively, first and second servo systems for rotating said first and second trimming wipers over the circumference of said first and second trimming windings respectively, a pair of stops disposed between each of said trimming wipers and the respective one of said trimming windings, each of said trimming windings and said respective wipers being held in a selected relationship relative to said main winding by said corresponding detent during travel of the trimming wiper over the turns of said respective trimming winding, said stops being positioned for limiting the angle of rotation of said trimming wipers in either direction with respect to said corresponding trimming windings, each of said servo systems being effective after said stops have been engaged to rotate said trimming winding for positioning its coarse-inductor wipers on different turns on said main winding; an input line, an output line that is to be matched to said input line over a wide range of frequencies, said input line being connected to said first and second trimming wipers for connecting said input line across a portion of said variable inductor, a capacitor-connecting switch operable successively to first, second and third positions, said capacitor-connecting switch in its first position connecting said output line between one end of said main winding and said first trimming wiper thereby connecting said output line across said variable inductor, an actuator mechanically coupled to said variable capacitor and to said capacitor-connecting switch, a control circuit including first and second limit switches for operating said actuator; said servo systems having individual input sensing circuits connected to said input line, said first servo system operating in response to a difference in phase between voltage and current on said input line, said first trimming wiper thereby being rotated by said first servo system, said first pair of coarse-inductor wipers rotated in the required direction in response to the engagement of one of said stops to decrease the difference in phase, said first limit switch operated by said first servo system simultaneously with positioning of said first coarse-inductor wipers for placing maximum inductance across said output line, said second servo system operating in response to variations from a predetermined ratio of current-to-voltage values on said line, said second trimming wiper and said second coarse-inductor wipers thereby being rotated by said second servo system in the required direction for obtaining the predetermined ratio, said second limit switch being operated by said second servo system simultaneously with positioning of said second coarse-inductor wipers for placing maximum inductance across said input line, said actuator operating in response to the operation of either of said limit switches for operating said capacitor-connecting switch and varying said capacitor, said capacitor-connecting switch in said second position connecting said capacitor in series with said output line and said inductor, said actuator varying the capacitance of said capacitor from maximum to minimum while said capacitor is connected in series, said capacitor-connecting switch in said third position connecting said variable capacitor in parallel wth said output line and said variable inductor, and said actuator varying the capacitance of said capacitor from minimum to maximum while said capacitor is connected in parallel.

5. In combination with an automatically-controlled electrical impedance matching system according to claim 4, a source of signal connected to said input line, control means for tuning said source for applying signal of selected frequency to said input line, homing means responsive to selection of signal of different frequency for initially returning said wipers of said inductor to positions for applying maximum inductance in parallel with said input lines and with said output lines, for operating said capacitor for maximum capacitance, and for returning said capacitor-connecting switch to its first position.

6. In an automatically-controlled electrical impedance matching system a tapped rotatable cylindrical inductor in combination with a variable capacitance control circuit, said inductor being of the type that has a conducting ribbon and a non-conducting cylinder, said cylinder having a helical groove on the outside surface thereof for receiving said ribbon, first means for varying the amount of said ribbon wound in said helical groove for varying the inductance of said inductor, a sliding contact, said contact being slidably positioned in said groove in electrical contact with said ribbon, second means for moving said contact within said groove to provide a continuously variable tap on said variable inductor, a variable capacitor, said control circuit including a capacitor-connecting switch, an actuator with an operating circuit that includes first and second limit switches, said actuator being drivingly coupled to said variable capacitor and to said capacitor-connecting switch, said capacitor-connecting switch being operable successively to first, second, and third positions, an input line, a source of signal connected to said input line for applying to said input line signal at any selected frequency within a wide frequency range, an output line, said capacitor-connecting switch initially being in its first position for connecting said output line directly in parallel with that portion of said ribbon that is wound on said non-conducting cylinder, said input line being connected to said sliding contact for connecting said input line across that portion of said ribbon determined by the position of said sliding contact, said first means including a phase sensing circuit connected to said input line, said first means being responsive to detection of out-of-phase voltage and current on said input line for varying the inductance of said inductor in the proper direction to decrease the difference in phase between said voltage and said current, said first means also effective to operat said first limit switch when said inductor provides maximum inductance across said output line, said actuator operating in response to operation of said first limit switch for operating said capacitor-connecting switch and for varying the capacitance of said capacitor, said capacitor-connecting switch in its second position connecting said variable capacitor in series with said output line and said inductor, said actuator continuing to operate to vary the capacitance of said capacitor from maximum to minimum while said capacitor is connected in series, said capacitor-connecting switch in its third position connecting said capacitor in parallel with said line and said inductor, said actuator continuing to operate to vary the capacitance of said capacitor from minimum to maximum while said capaictor is connected in parallel, said second means including a load sensing circuit connected to said input line, said second means operating in response to variation in loading from a predetermined loading of said input line to move said sliding contacts within said groove, said second means also operating said second limit switch when said sliding contact is positioned for providing maximum inductance across said input line, and said actuator operating in response to the operation of said second limit switch for operating said capacitor-connecting switch successively to its first, second, and third positions and for varying the capacitance of said capacitor from maximum to minimum while said switch is in its second position and from minimum to maximum while said switch is in its third position.

References Cited in the file of this patent

UNITED STATES PATENTS

| | | |
|---|---|---|
| 1,497,411 | Snell | June 10, 1924 |
| 1,524,976 | Kautz | Feb. 3, 1925 |
| 2,376,667 | Cunningham et al. | May 22, 1945 |
| 2,742,618 | Weber | Apr. 17, 1956 |
| 2,745,067 | True et al. | May 8, 1956 |